(12) United States Patent
Lee et al.

(10) Patent No.: US 9,294,206 B2
(45) Date of Patent: Mar. 22, 2016

(54) METHOD OF CONTROLLING A WIRELESS AUDIO SIGNAL

(71) Applicant: SAMSUNG ELECTRONICS CO., LTD., Suwon-si (KR)

(72) Inventors: Seung-bok Lee, Suwon-si (KR); Je-hwan Seo, Daegu (KR); Geun-sam Yang, Suwon-si (KR); Tae-hyeun Ha, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 246 days.

(21) Appl. No.: 13/955,821

(22) Filed: Jul. 31, 2013

(65) Prior Publication Data

US 2014/0140531 A1 May 22, 2014

(30) Foreign Application Priority Data

Nov. 19, 2012 (KR) .................... 10-2012-0131140

(51) Int. Cl.
*H04B 3/00* (2006.01)
*H04H 20/61* (2008.01)
*H04N 13/04* (2006.01)

(52) U.S. Cl.
CPC ........... *H04H 20/61* (2013.01); *H04N 13/0438* (2013.01); *H04N 13/0497* (2013.01); *H04N 2013/0463* (2013.01)

(58) Field of Classification Search
None
See application file for complete search history.

(56) References Cited

U.S. PATENT DOCUMENTS

| 6,651,207 | B1 * | 11/2003 | Dicker et al. | 714/746 |
| 2009/0275299 | A1 * | 11/2009 | Buch et al. | 455/161.1 |
| 2011/0279658 | A1 * | 11/2011 | Masuda et al. | 348/53 |
| 2012/0050466 | A1 * | 3/2012 | Okada et al. | 348/43 |
| 2012/0115421 | A1 * | 5/2012 | Wu et al. | 455/62 |

FOREIGN PATENT DOCUMENTS

| KR | 10-0653080 B1 | 12/2006 |
| KR | 10-0676057 B1 | 1/2007 |
| KR | 10-2007-0046289 A | 5/2007 |
| KR | 10-2012-0029025 A | 3/2012 |
| WO | WO 2012062174 A1 * | 5/2012 |

OTHER PUBLICATIONS

Communication dated Feb. 27, 2014 issued by the International Searching Authority in counterpart International Application No. PCT/KR2013/010102 (PCT/ISA/210).
Communication dated Feb. 27, 2014 issued by the Korean Intellectual Property Office in counterpart Korean Application No. 10-2012-0131140.
Communication, dated Oct. 29, 2013, issued by the Korean Intellectual Property Office, in counterpart Application No. 10-2012-0131140.

* cited by examiner

Primary Examiner — Thang Tran
(74) *Attorney, Agent, or Firm* — Sughrue Mion, PLLC

(57) ABSTRACT

A method of controlling a wireless audio signal in order to avoid frequency interference between a display apparatus with a multi-view function and glasses with a function of receiving a wireless audio signal is provided.
The method of controlling a wireless audio signal in a wireless audio signal transmitting device includes: pairing with a wireless audio signal receiving device using a first frequency band; detecting frequency interference by an external device other than the paired wireless audio signal receiving device; scanning a frequency when frequency interference is detected; determining whether a frequency change is needed using information related to the scanned frequency; and changing an audio signal transmitting frequency when frequency change is needed.

15 Claims, 6 Drawing Sheets

METHOD OF CONTROLLING A WIRELESS AUDIO SIGNAL

CROSS-REFERENCE TO RELATED APPLICATION

This application claims priority from Korean Patent Application No. 10-2012-0131140, filed on Nov. 19, 2012 in the Korean Intellectual Property Office, the disclosure of which is incorporated herein by reference, in its entirety.

BACKGROUND

1. Field

Methods consistent with the exemplary embodiments relate to a method of controlling a wireless audio signal in order to process a wireless audio signal. More particularly, the exemplary embodiments relate to a method of controlling a wireless audio signal to avoid frequency interference between a display apparatus with a multi-view function and glasses with a function of receiving a wireless audio signal.

2. Description of the Related Art

A variety of low power wireless devices using a frequency band available without authorization in the world have been developed and are utilized. Domestically, frequency bands of 2.4 GHz and 5.7 GHz are open for various purposes and uses under the standards stipulated in Radio Regulation Law. Thus, products in the field of wireless multimedia transmission using such frequency bands, for example, wireless headphones, a wireless microphone, and a wireless speaker for transmitting a wireless audio signal, and a wireless monitoring camera and wireless Internet broadcasting for transmitting a wireless video signal, are vigorously developing. Such various applications may be used in the same area. In this instance, when the frequency bands are used for transmitting a wireless multimedia signal, frequency interference between users causes serious deterioration in transmission quality.

SUMMARY

An aspect of one or more exemplary embodiments is to provide a method of controlling a wireless audio signal in order to prevent audio interference by outside interference.

Another aspect of one or more exemplary embodiments is to provide a method of controlling a wireless audio signal between a display apparatus with a dual-view function and dual-view glasses.

The foregoing and/or other aspects may be achieved by providing a method of controlling a wireless audio signal, the method including: pairing a wireless audio signal transmitter with a wireless audio signal receiver using a first frequency band; detecting frequency interference by an external device other than the paired wireless audio signal receiver; scanning a frequency when frequency interference is detected; determining whether a frequency change is needed using information related to the scanned frequency; and changing an audio signal transmitting frequency when a frequency change is needed to reduce interference.

According to an aspect of another exemplary embodiment, the wireless audio signal transmitting device may include a display apparatus having a multi-view function.

According to an aspect of another exemplary embodiment, the wireless audio signal receiving device may include glasses configured to receive and reproduce an audio signal from the display apparatus.

According to an aspect of another exemplary embodiment, scanning the frequency may include scanning a channel satisfying a frequency change condition by detecting a received signal strength indication (RSSI) by three channels in a first frequency band.

According to an aspect of another exemplary embodiment, the determining whether the frequency change is needed may determine that the frequency change is needed when a difference between a maximum RSSI and a minimum RSSI of each channel is greater than 30 dBm.

According to an aspect of another exemplary embodiment, the scanning the frequency may include first round scanning in which three channels of the first frequency band and two channels of a second frequency band are scanned; second round scanning in which the three channels of the first frequency band, one channel of the second frequency band, and one channel of a third frequency band are scanned; and third round scanning in which the three channels of the first frequency band and two channels of the third frequency band are scanned.

As described above, a method of controlling a wireless audio signal according to one or more exemplary embodiments provides the following effects.

First, interference by a different device may be minimized in transmission of an audio signal between wireless devices.

In addition, a single digital display apparatus displaying two different screens may stably provide a wireless audio signal.

In another exemplary embodiment, frequency interference may be detected through an external device other than the paired wireless audio signal receiving device.

The determining whether a frequency change is needed may use information related to the scanned frequency.

Another exemplary embodiment may provide a method of controlling a wireless audio signal including: using a first frequency band to pair a wireless audio signal transmitting device with a wireless audio signal receiving device; detecting frequency interference; and changing an audio signal transmitting frequency when frequency change is needed. The method may further include scanning a channel satisfying a frequency change condition by detecting a received signal strength indication (RSSI) by three channels in the first frequency band.

The method may further include scanning a wireless intensity of each of all bands when there is no channel in the first frequency band which satisfies the frequency change condition in the first frequency band.

Scanning the frequency may include first round scanning in which three channels of the first frequency band and two channels of a second frequency band are scanned.

The method may further include second round scanning in which the three channels of the first frequency band, one channel of the second frequency band, and one channel of a third frequency band are scanned.

Additionally, the method may further include third round scanning in which the three channels of the first frequency band and two channels of the third frequency band are scanned.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Figure 1:
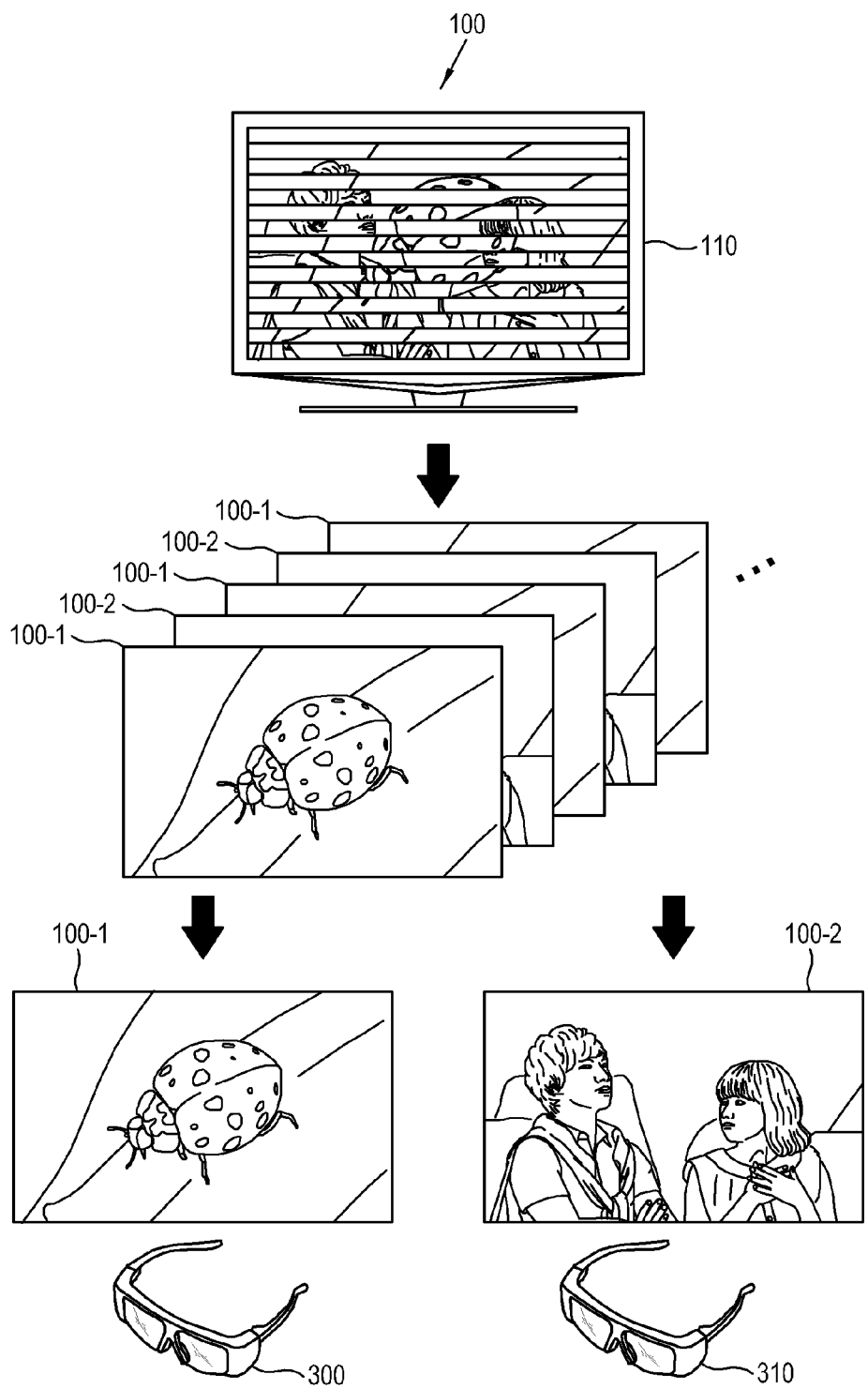
FIG. 1 illustrates an environment of a display system, according to an exemplary embodiment.

Below, exemplary embodiments will be described in detail with reference to accompanying drawings so as to be easily understood by a person having ordinary knowledge in the art. The exemplary embodiments may be embodied in various forms without being limited to the exemplary embodiments set forth herein. Descriptions of well-known parts are omitted for clarity and conciseness, and like reference numerals refer to like elements throughout.

Exemplary embodiments relate to a method of controlling a wireless audio signal. Hereinafter, an exemplary embodiment in which the method is applied to a display apparatus processing a wireless audio signal will be described.

FIG. 1 illustrates an environment of a display system according to an exemplary embodiment. The display system according to an exemplary embodiment includes a display apparatus 100 and a plurality of pairs of three-dimensional (3D) glasses 300 and 310. The display apparatus 100 has a function of alternately outputting a plurality of contents. Using this function, the display apparatus 100 alternately outputs different contents, instead of left-eye and right-eye images, and two or more pairs of 3D glasses 300 and 310 open or close left-eye and right-eye shutters simultaneously, thereby enabling two or more users to view the different contents. In the following description, a mode enabling two or more users to watch different contents is referred to as a dual-view mode.

To provide a stereoscopic image service, the display apparatus 100 alternately outputs left-eye and right-eye images and transmits infrared fashion, a synchronization signal, synchronized with a timing of outputting the images, to the 3D glasses. The pairs of 3D glasses 300 and 310 alternately open or close the left-eye and right-eye shutters based on the synchronization signal infrared-received from the display apparatus 100, thereby providing a stereoscopic image to a viewer.

Meanwhile, in a method of alternately outputting different images, as shown in FIG. 1, the display apparatus 100 alternately outputs a first content 100-1 and a second content 100-2. That is, the first content 100-1 and the second content 100-2 are alternately output to a display of the display apparatus 100 at a timing of 60 Hz, 120 Hz, or 240 Hz.

Here, the display apparatus 100 wirelessly transmits a synchronization signal, synchronized with an output timing of each of the contents 100-1 and 100-2, to each pair of the 3D glasses. That is, a first synchronization signal, synchronized with a timing of outputting the first content 100-1 on the display of the display apparatus 100, is transmitted to first 3D glasses 300 for watching the first content 100-1, while a second synchronization signal, synchronized with a timing of outputting the second content 100-2 on the display of the display apparatus 100, is transmitted to second 3D glasses 310 for watching the second content 100-2. Such transmission is carried out using an infrared signal or by using a radio frequency (RF) signal.

Then, based on the received first synchronization signal, the first 3D glasses 300 open the left-eye and right-eye shutters simultaneously when the first content 100-1 is output to the display of the display apparatus 100, and then close the left-eye and right-eye shutters simultaneously when the second content 100-2 is output to the display of the display apparatus 100.

Likewise, based on the received second synchronization signal, the second 3D glasses 310 close the left-eye and right-eye shutters simultaneously when the first content 100-1 is output to the display of the display apparatus 100, and then open the left-eye and right-eye shutters simultaneously when the second content 100-2 is output to the display of the display apparatus 100.

In this way, a user wearing the first 3D glasses 300 is only allowed to watch the first content 100-1, while a user wearing the second 3D glasses 310 is only allowed to watch the second content 100-2.

Unlike transmission of images corresponding to a plurality of contents as described above, a different method is used in audio transmission. That is, since two or more users are watching contents through a single display apparatus in the same space, it is inappropriate to output different audio signals simultaneously. Thus, in the display system according to the present embodiment, the display apparatus 100 may wirelessly transmit a first audio signal to the first 3D glasses 300 which corresponds to the first content 100-1 and transmit a second audio signal to the second 3D glasses 310 which corresponds to the second content 100-2.

Alternatively, the display apparatus 100 may comprise the first audio signal corresponding to the first content 100-1 and the second audio signal corresponding to the second content 100-2 into a multichannel signal and transmit the multichannel signal to the plurality of pairs of 3D glasses 300 and 310. Each pair of 3D glasses selects a channel of an audio signal which corresponds to a content to watch, thereby listening to the audio signal corresponding to the content. The audio signal corresponding to the selected channel is an audio signal included in a content which corresponds to a received synchronization signal, i.e., an audio signal which corresponds to an image shown to a user wearing 3D glasses.

In the foregoing description, the display apparatus 100 may be, for example, an image output apparatus providing a 3D content, such as a 3D display apparatus, but may also include any display apparatus incapable of outputting a 3D image as long as the device is able to alternately output a plurality of contents, without being limited to a preceding example. Further, although two pairs of 3D glasses are illustrated in the description of the display system of an exemplary embodiment, it is apparent to a person skilled in the art that three or more pairs of 3D glasses may be used in response to the display apparatus 100 providing three or more contents.

The display system to watch two or more contents has been described. Hereinafter, a display apparatus and 3D glasses which constitute the display system will be described in detail.

Figure 2:
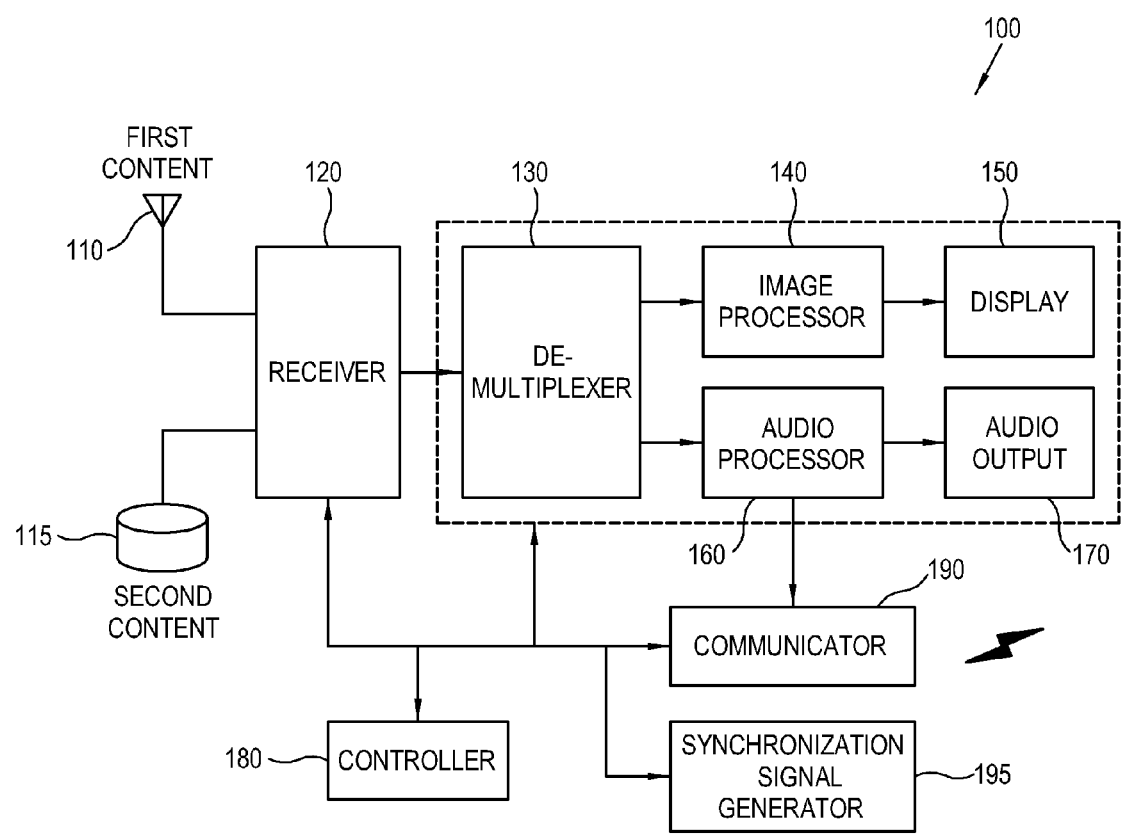
FIG. 2 is a block diagram illustrating a configuration of a display apparatus 100, according to an exemplary embodiment.

FIG. 2 is a block diagram which illustrates a configuration of a display apparatus 100, according to an exemplary embodiment. The display apparatus 100 according to an exemplary embodiment includes a receiver 120, a de-multiplexer 130, an image processor 140, a display 150, an audio processor 160, an audio output 170, a controller 180, a communicator 190, and a synchronization signal generator 195.

The receiver 120 functions to receive an image content wirelessly through an antenna 110 or through a function of receiving an image content via a cable through an external device 115. Here, the external device 115 is an apparatus capable of providing image content, for example, a DVD or a set-top box. Further, the received image content includes a two-dimensional (2D) image and a 3D image, and two or more image contents may be received. The receiver 120 provides the received image content to the de-multiplexer 130.

The de-multiplexer 130 separates the image content signal received from the receiver 120 into an image signal and an audio signal and outputs the image signal and the audio signal to the image processor 140 and the audio processor 160, respectively. The image processor 140 decodes the image signal separated in the de-multiplexer 130, converts the image signal into an image signal in a format to be output on the display 150, and provides the converted image signal to the display 150. The audio processor 160 decodes the audio signal separated in the de-multiplexer 130, converts the audio signal into an audio signal in a format to be output in the audio output 170, and provides the audio signal to the audio output 170.

When the audio processor 160 transmits audio signals respectively included in a plurality of image contents to an external device, that is, 3D glasses, through the communicator 190 in a form of a multichannel audio signal, the audio processor 160 may compose the plurality of received audio signals into a multichannel audio signal.

The display 150 has a function of outputting the image signal provided from the image processor 140. In particular, when a plurality of image signals corresponding to a plurality of image contents is input in a dual-view mode, the display 150 alternately outputs the image signals, thereby providing the plurality of image contents to a plurality of users.

The audio output 170 outputs and provides the audio signal received from the audio processor 160 to a user. The controller 180 is involved in overall operations of the display apparatus 100 and has a function of controlling operations of the receiver 120, the de-multiplexer 130, the image processor 140, the display 150, the audio processor 160, the audio output 170, the communicator 190, and the synchronization signal generator 195.

Specifically, the controller 180 controls the synchronization signal generator 195, thereby generating a synchronization signal synchronized with a timing of outputting the image signal received from the image processor 140 when the image signal is output to the display 150. The generated synchronization signal is transmitted to an external device, such as 3D glasses, through the communicator 190. Further, the controller 180 transmits a plurality of audio signals processed in the audio processor 160 to a plurality of external devices, such as a plurality of pairs of 3D glasses, respectively, or transmitting a multichannel audio signal processed in the audio processor 160 to an external device through communicator 190.

The communicator 190 has a function of transmitting a synchronization signal or a plurality of audio signals to an external device under the control of the controller 180.

The synchronization signal generator 195 generates a synchronization signal synchronized with a timing of outputting an image to the display 150 and transmits the synchronization signal to an external device, such as 3D glasses, thereby linking the display apparatus 100 and the external device.

Regarding the configuration of the display apparatus 100 described above, a synchronization signal or an audio signal has been described as being transmitted to the external device through the communicator 190. However, a synchronization signal which is generated in the synchronization signal generator 195 may be transmitted using an infrared radio (IR) signal instead of an RF signal, and accordingly the communicator 190 may be configured to enable both IR transmission and RF transmission. Alternatively, the communicator 190 may include separate elements, an RF transmission and an IR transmission. Such modifications and alternations are apparent to a person skilled in the art.

Figure 3:
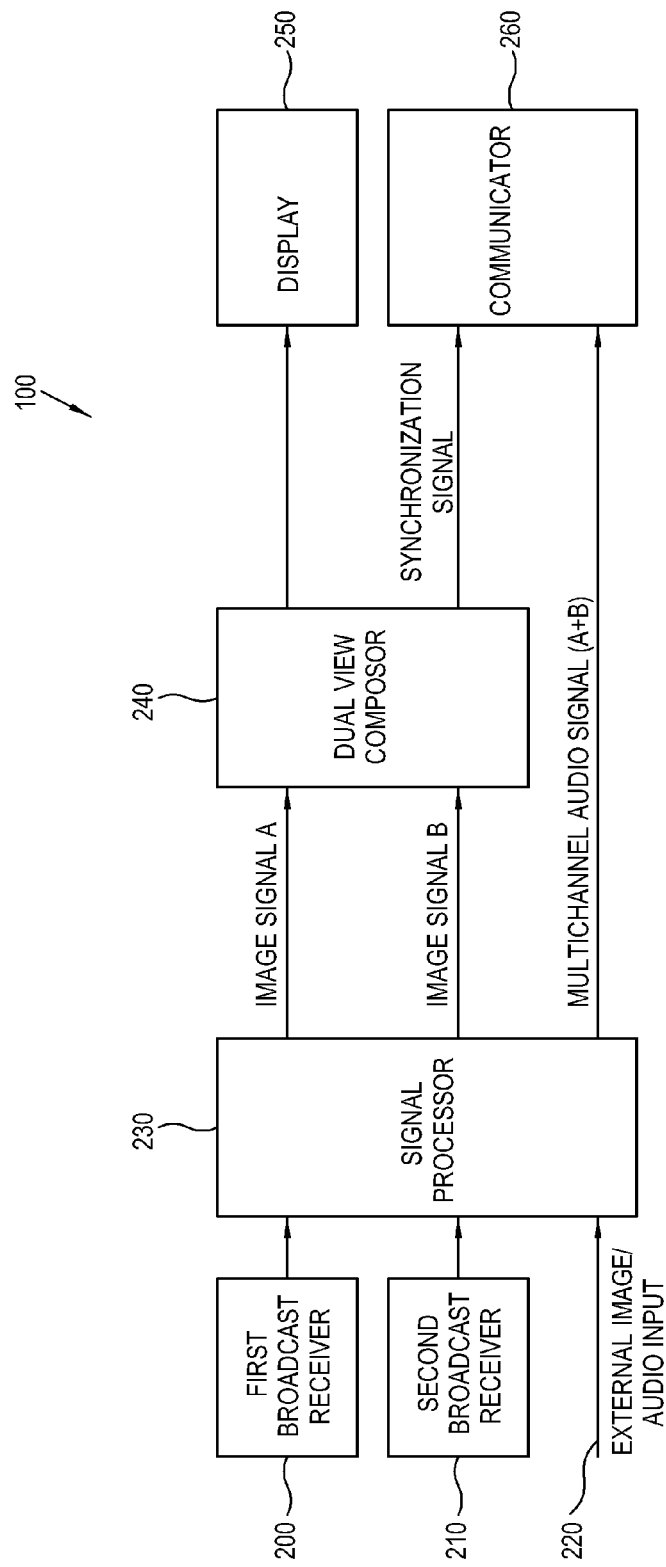
FIG. 3 illustrates an operation of a display apparatus, according to an exemplary embodiment.

FIG. 3 illustrates an operation of a display apparatus according to an exemplary embodiment. The display apparatus according to an exemplary embodiment includes a first broadcast receiver 200, a second broadcast receiver 210, a signal processor 230, a dual view composer 240, a display 250, and a communicator 260.

The display apparatus according to an exemplary embodiment includes a plurality of receivers to output two or more contents. Different broadcast contents may be received through the first broadcast receiver 200 and the second broadcast receiver 210. Contents including an image and an audio may be received from an external device 220 connected via a cable or wirelessly. In the following description, a dual view mode in which two contents, a content A and a content B, are received will be illustrated. However, the dual view mode is a kind of multi-view mode in which a plurality of contents is displayed through a single display apparatus, and thus the exemplary embodiment is not limited to the dual view mode.

The signal processor 230 has a function of separating image and audio signals included in a plurality of contents received from a plurality of receivers 200, 210, and 220. And then the signal processor 230 decodes and converts the image signals to be displayed on the display 250. The signal processor 230 converts the audio signals into audio signals to be output. In transmitting an audio signal to the outside, the signal processor 230 may extract audio signals from a plurality of contents and compose the signals, thereby generating a multichannel audio signal.

The signal processor 230 composes an audio signal A which corresponds to the content A and an audio signal B which corresponds to the content B into a multichannel audio signal A+B and wirelessly transmits the multichannel audio signal A+B to an external device through the communicator 260.

The dual view composer 240 provided with an image signal A and an image signal B included in the contents A and B performs image processing to alternately output frames included in each of the image signals. A dual view composed image A+B processed in the dual view composer 240 is output through the display 250. Here, the image output through the display 250 is an image obtained by alternately outputting the frames included in the content A and the frames included in the content B.

Hereinafter, a process of the display apparatus transmitting a plurality of audio signals processed in the audio processor 160 to a plurality of external devices, such as a plurality of pairs of 3D glasses, respectively, or transmitting a multichannel audio signal processed in the audio processor 160 to an external device through the communicator 190 will be described. That is, a device for transmitting a wireless audio signal is a display apparatus having a multi-view function, while a device for receiving a wireless audio signal is glasses having a function of receiving and reproducing an audio signal from the display apparatus.

Figure 4:
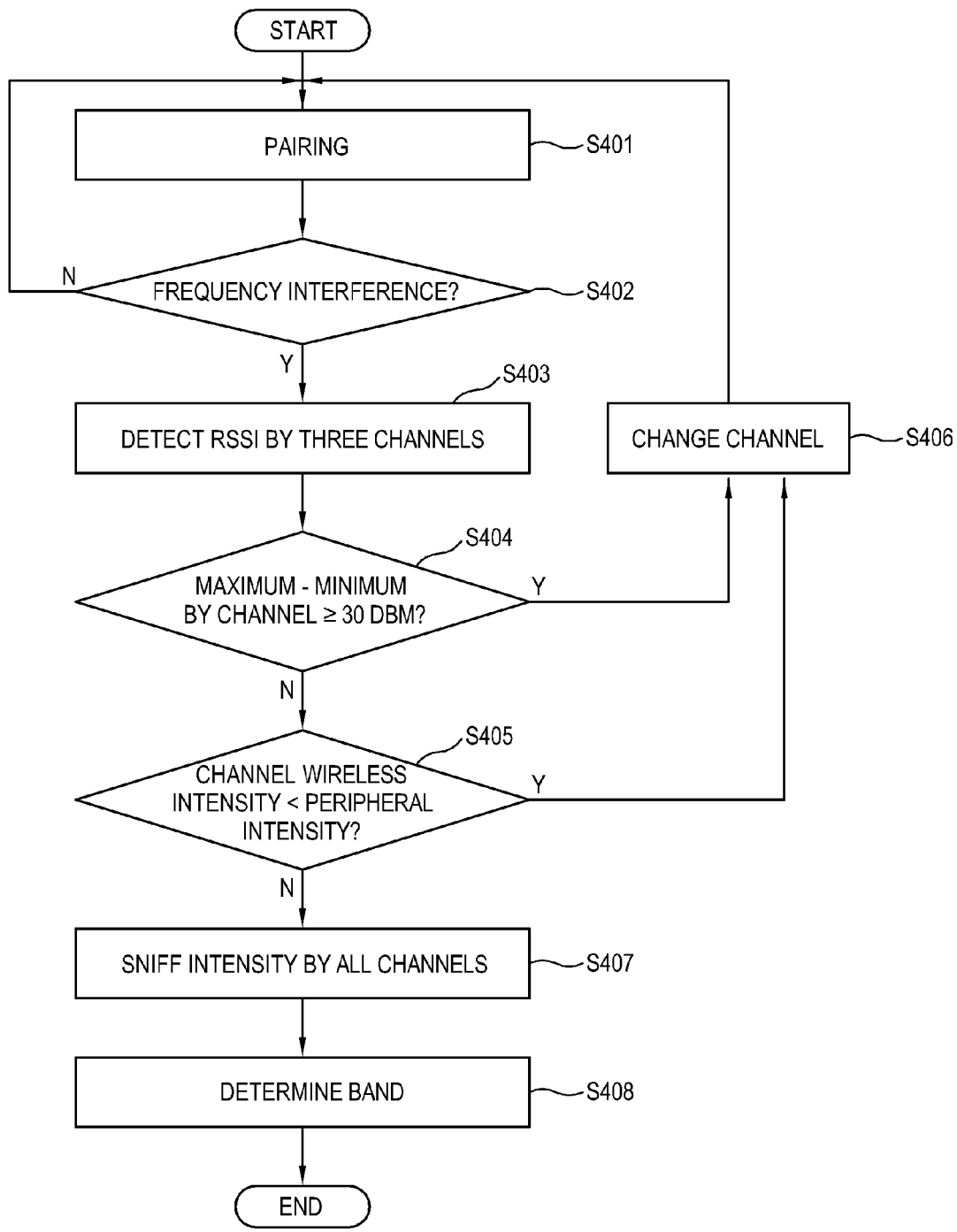
FIG. 4 is a flowchart illustrating a process of controlling a wireless audio signal, according to an exemplary embodiment.

FIG. 4 is a flowchart which illustrates a process of controlling a wireless audio signal according to an exemplary embodiment.

When a process for displaying multiple screens on the display apparatus is carried out, the audio processor 160 conducts wireless frequency pairing using a first frequency band so as to process a plurality of audio signals which correspond to the respective screens and transmit the signals to an external device, for example, a device for receiving a wireless audio signal, through a device for transmitting a wireless audio signal (S401).

When detecting whether there is frequency interference by an external device, other than the paired device for receiving the wireless audio signal (S402), frequencies by three channels in a current frequency band are scanned to detect a received signal strength indication (RSSI) (S403).

Then, determining whether a frequency change is needed using information related to the scanned frequency is carried out, wherein it is first detected whether there is a channel having a difference between a maximum RSSI and a minimum RSSI of 30 dBm (S404).

When there is a channel satisfying the foregoing condition, a frequency is changed to the corresponding channel (S406).

When there is no channel satisfying the condition, a channel having a smaller wireless intensity than peripherals is detected by verifying wireless intensity of each channel, and a frequency is changed to the channel (S405).

When operations 5404 and 5405 are not satisfied, intensity by each of all bands are sniffed. Scanning each channel is illustrated in the following table.

|  | 5.8 GHz | | | 5.2 GHz | | | 2.4 GHz | | |
| --- | --- | --- | --- | --- | --- | --- | --- | --- | --- |
|  | ch1 | ch2 | ch3 | ch1 | ch2 | ch3 | ch1 | ch2 | ch3 |
| 1 round scan | o | o | o | o | o | | | | |
| 2 round scan | o | o | o | | | | o | o | |
| 3 round scan | o | o | o | | | | | o | o |

It takes about 2.4 seconds to sniff each band. That is, 3 round×5 ch×1.25 ms×128 packets=2.4 sec. Here, this required time may vary depending on each wireless frequency solution.

Sniffing the intensity by each of all bands includes three rounds of scanning. In each round, a total of five channels including three channels of a base band (5.8 GHz) plus two channels of second bands of 5.2 GHz or 2.4 GHz are scanned. Each round takes about 1.25 milliseconds (ms) and intensity is 128 packets.

First, in first round scanning, three channels in a first frequency band of 5.8 GHz and two channels in a second frequency band of 5.2 GHz are scanned.

In second round scanning, the three channels in the first frequency band, one channel in the second frequency band, and one channel in a third frequency band are scanned.

In third round scanning, the three channels in the first frequency band and two channels in the third frequency band are scanned (S407).

Then, a band determination process for switching to a band with best conditions is carried out (S408), which is achieved based on a judgment, as follows.

Figure 5:
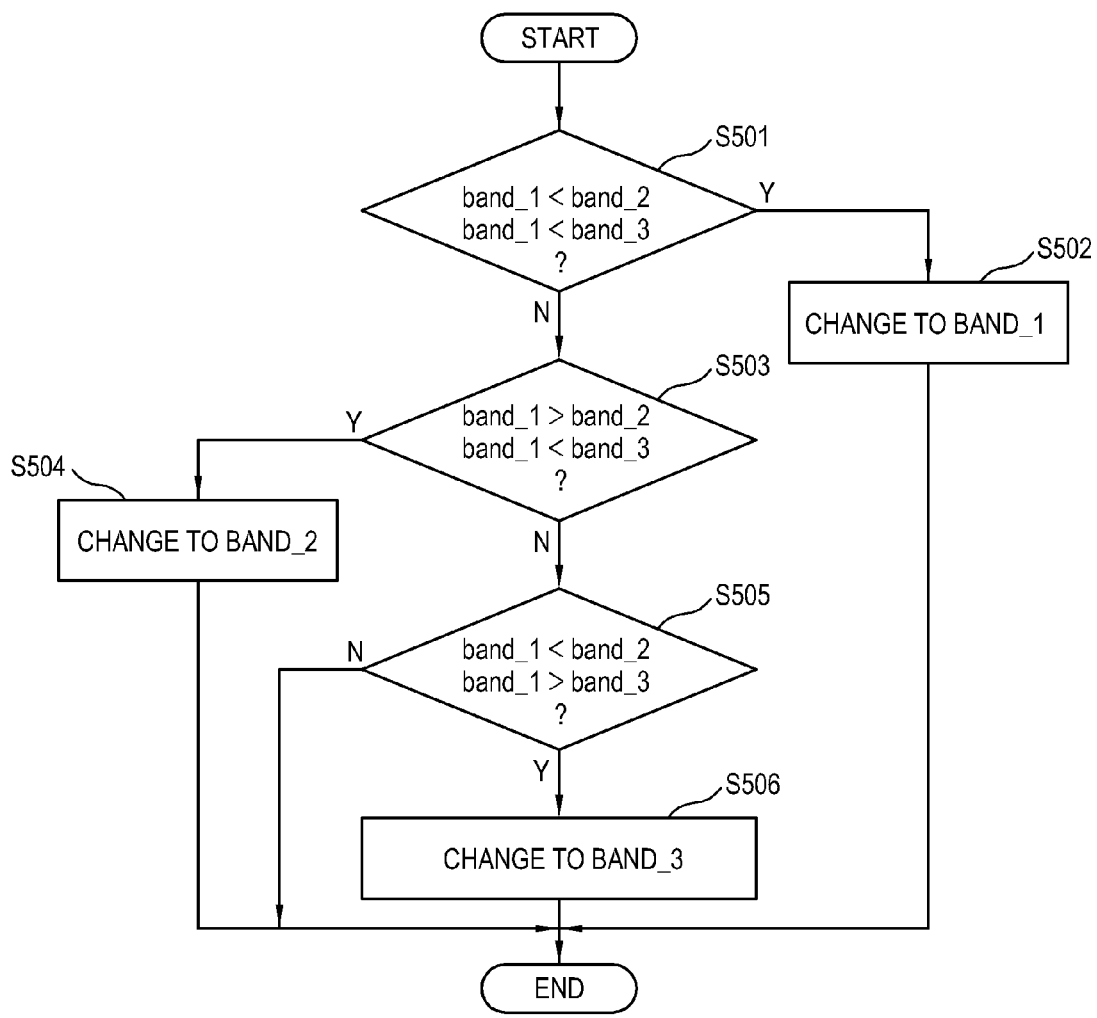
FIG. 5 is a flow chart illustrating a band determination process.

FIG. 5 is a flow chart which illustrates the band determination process.

When an average intensity of the three channels of the first band is lower than an average intensity of three channels of the second band and is lower than an average intensity of three channels of the third band among wireless frequencies having an RSSI of 65 dBm or higher (S501); that is, band_1<band_2 and band_1<band_3, the first band is maintained or a band is changed to the first band (S502).

Alternatively, when the average intensity of the three channels of the first band is higher than the average intensity of the three channels of the second band and is lower than the average intensity of the three channels of the third band among wireless frequencies having an RSSI of 65 dBm or higher, band_1>band_2 and band_1<band_3 (S503); that is, band_2<band_1<band_3, the second band with a smallest intensity is maintained or a band is changed to the second band (S504).

Alternatively, in response to a determination of whether the average intensity of the three channels of the first band is lower than the average intensity of the three channels of the second band and is higher than the average intensity of the three channels of the third band; that is, band_1<band_2 and band_1>band_3 (S505). Namely, when band_3<band_1<band_2, the third band with a smallest intensity is maintained or a band is changed to the third band (S506).

When an audio data drop occurs due to a higher wireless intensity of three channels in one band than a predetermined level, the band is masked so that a frequency in the band is not scanned until a predetermined condition for unmasking is satisfied.

Figure 6:
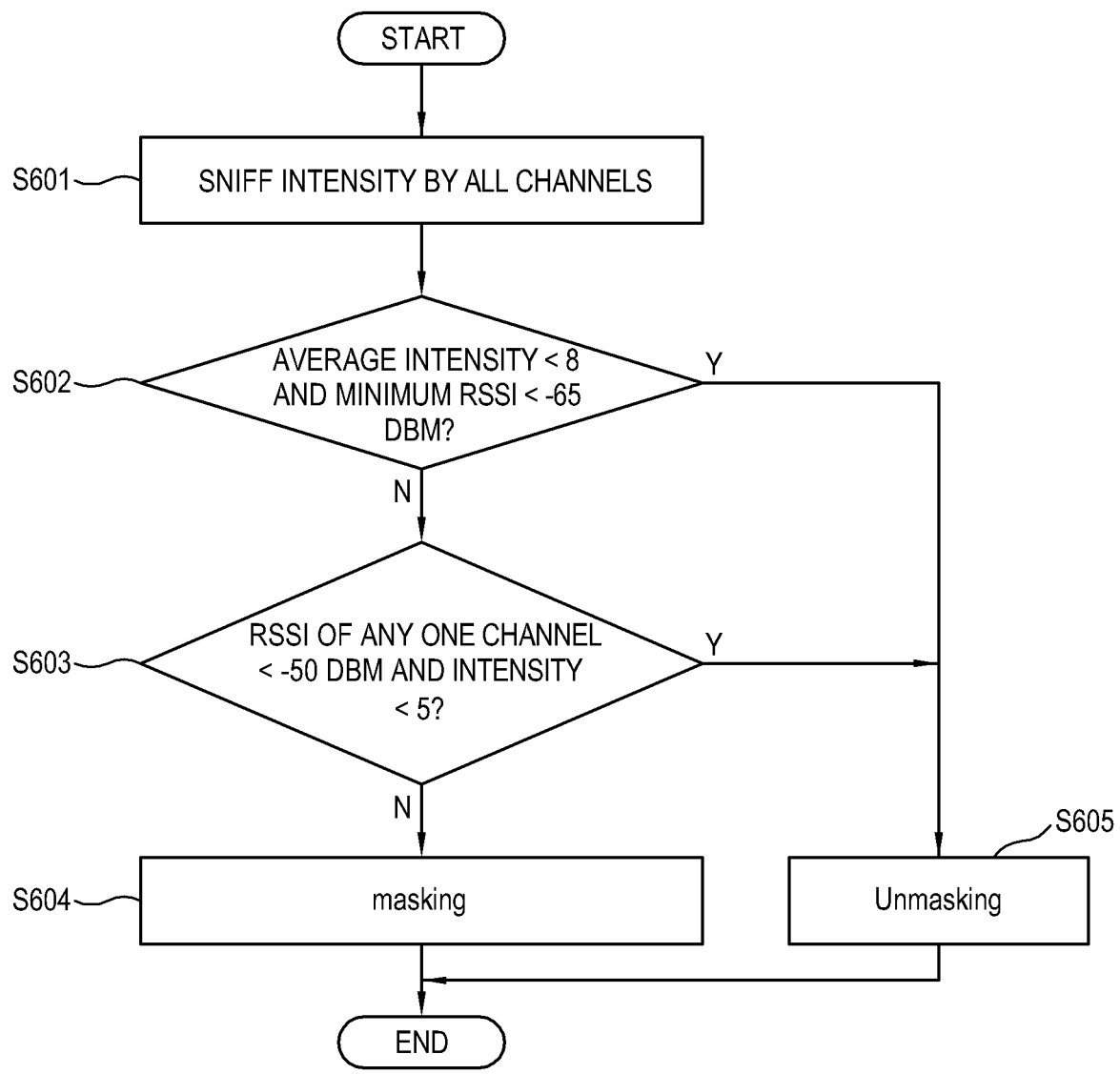
FIG. 6 is a flowchart illustrating a process of determining an unmasking condition of a masked band.

The predetermined condition for unmasking will be described below with reference to FIG. 6.

First, intensity of each of all bands is sniffed (S601).

An identification is made as to whether an average wireless intensity of three channels in a masked band is lower than a specified value A and a minimum RSSI in the band is −65 dBm or lower (S602). When this condition is satisfied, the band is unmasked (S605). Here, the specified value A may be predetermined or may be determined based on current reception intensity. In an exemplary embodiment, the specified value A is set to "8".

When this condition is not satisfied, a determination is made as to whether a wireless intensity of at least one channel in the masked band is lower than a specified value B and the minimum RSSI is −50 dBm or lower (S603). The specified value B is set to "5" When this condition is satisfied, the band is unmasked (S605).

When the above two conditions in operations 5602 and 5603 are not satisfied, the band is kept masked (S604).

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A method of controlling a display apparatus having a multi-view function, the method comprising:
   pairing with glasses which receive an audio signal from the display apparatus and reproduce the audio signal using a first frequency band;
   transmitting the audio signal to the glasses using an audio signal transmitting frequency;
   detecting frequency interference from external devices other than the paired glasses;
   scanning a frequency when the frequency interference is detected;
   determining whether a frequency change is needed using the scanned frequency; and
   changing the audio signal transmitting frequency when the frequency change is needed.

2. The method of claim 1, wherein scanning the frequency scans a channel satisfying a frequency change condition by detecting a received signal strength indication (RSSI) by three channels in the first frequency band.

3. The method of claim 2, wherein determining whether the frequency change is needed comprises determining a difference between a maximum RSSI and a minimum RSSI of each channel, and determining that the frequency change is needed in response to the determined difference between the maximum RSSI and the minimum RSSI of each channel being greater than 30 dBm.

4. The method of claim 2, wherein determining whether the frequency change is needed comprises determining a wireless intensity of each channel and a wireless signal intensity of the external devices, and determining that the frequency change is needed in response to the wireless intensity of each channel being lower than the wireless signal intensity of the external devices.

5. The method of claim 2, wherein scanning the frequency scans a wireless intensity of each of all bands when there is no channel in the first frequency band which satisfies the frequency change condition in the first frequency band.

6. The method of claim 5, wherein scanning the frequency comprises first round scanning in which three channels of the first frequency band and two channels of a second frequency band are scanned; second round scanning in which the three channels of the first frequency band, one channel of the second frequency band, and one channel of a third frequency band are scanned; and third round scanning in which the three channels of the first frequency band and two channels of the third frequency band are scanned.

7. The method of claim 1, the method further comprises that detecting whether an audio data drop occurs due to a wireless intensity of three channels in one band being higher than a predetermined level;
masking the band in response to the detection of the audio data drop so that a frequency in the band is not scanned until a predetermined condition for unmasking is satisfied.

8. The method of claim 7, wherein the predetermined condition for unmasking comprises an average wireless intensity of three channels in the masked band being lower than a specified value A and a minimum RSSI in the band of −65 dBm or lower.

9. The method of claim 7, wherein the predetermined condition for unmasking comprises a wireless intensity of at least one channel in the masked band which is less than a specified value B and a minimum RSSI of −50 dBm or lower.

10. The method of claim 1, wherein the determining whether a frequency change is needed uses information related to the scanned frequency.

11. A method of controlling a wireless audio signal transmitting device, the method comprising:
pairing with a wireless audio signal receiving device using a first frequency band;
detecting frequency interference from external devices;
scanning a frequency satisfying a frequency change condition by detecting a received signal strength indication (RSSI) by three channels in the first frequency band; and
changing an audio signal transmitting frequency when frequency change is needed in response to the detection of the frequency interferences and detected RSSI.

12. The method of claim 11, wherein scanning a frequency scans a wireless intensity of each of all bands when there is no channel which satisfies the frequency change condition in the first frequency band.

13. The method of claim 12, wherein scanning a frequency comprises first round scanning in which three channels of the first frequency band and two channels of a second frequency band are scanned.

14. The method of claim 13 wherein scanning a frequency further comprises;
second round scanning in which the three channels of the first frequency band, one channel of the second frequency band, and one channel of a third frequency band are scanned.

15. The method of claim 14, wherein scanning a frequency further comprises third round scanning in which the three channels of the first frequency band and two channels of the third frequency band are scanned.

* * * * *